(12) United States Patent
Zhao et al.

(10) Patent No.: US 11,558,603 B2
(45) Date of Patent: *Jan. 17, 2023

(54) METHOD AND APPARATUS FOR INTRA PREDICTION FOR NON-SQUARE BLOCKS IN VIDEO COMPRESSION

(71) Applicant: TENCENT AMERICA LLC, Palo Alto, CA (US)

(72) Inventors: Liang Zhao, Sunnyvale, CA (US); Xin Zhao, San Diego, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/450,791

(22) Filed: Oct. 13, 2021

(65) Prior Publication Data

US 2022/0046230 A1 Feb. 10, 2022

Related U.S. Application Data

(63) Continuation of application No. 16/752,342, filed on Jan. 24, 2020, now Pat. No. 11,240,490, which is a
(Continued)

(51) Int. Cl.
*H04N 19/103* (2014.01)
*H04N 19/176* (2014.01)
(Continued)

(52) U.S. Cl.
CPC ......... *H04N 19/103* (2014.11); *H04N 19/117* (2014.11); *H04N 19/159* (2014.11); *H04N 19/176* (2014.11); *H04N 19/189* (2014.11)

(58) Field of Classification Search
None
See application file for complete search history.

(56) References Cited

U.S. PATENT DOCUMENTS 8,526,495 B2   9/2013   Liu et al.
9,049,452 B2   6/2015   Liu et al.
(Continued)

FOREIGN PATENT DOCUMENTS

EP       3 477 951 A1      5/2019
WO    WO 2008/102805 A1   8/2008
(Continued)

OTHER PUBLICATIONS

High Efficiency Video Coding, Rec. ITU-T H.265 v4 Dec. 2016.
(Continued)

*Primary Examiner* — Tyler W. Sullivan
(74) *Attorney, Agent, or Firm* — ArentFox Schiff LLP

(57) ABSTRACT

A method for video encoding includes determining, for a current block that is a non-square block, whether an angular intra prediction mode for the current block is a wide angle mode that is in a direction outside of a range of directions that spans a bottom left diagonal direction and top right diagonal direction of the current block. The method further includes, in response to determining that the angular intra prediction mode is the wide angle mode, enabling an intra smooth filter and applying the enabled intra smoothing filter to blocks neighboring the current block to generate filtered blocks. The method further includes performing intra prediction based on the filtered blocks to encode the current block.

20 Claims, 13 Drawing Sheets

Related U.S. Application Data continuation of application No. 16/147,533, filed on Sep. 28, 2018, now Pat. No. 10,567,752.

(60) Provisional application No. 62/693,046, filed on Jul. 2, 2018.

(51) Int. Cl.
  *H04N 19/189* (2014.01)
  *H04N 19/117* (2014.01)
  *H04N 19/159* (2014.01)

(56) References Cited

U.S. PATENT DOCUMENTS

| | | | |
|---|---|---|---|
| 9,363,511 | B2 | 6/2016 | Zhang et al. |
| 9,510,012 | B2 | 11/2016 | Liu et al. |
| 9,769,472 | B2 | 9/2017 | Liu et al. |
| 9,813,726 | B2 | 11/2017 | Liu et al. |
| 9,894,386 | B2 | 2/2018 | Lee |
| 9,998,759 | B2 | 6/2018 | Jeon et al. |
| 10,284,844 | B1 | 5/2019 | Zhao et al. |
| 10,284,860 | B1 | 5/2019 | Zhao et al. |
| 10,404,980 | B1 | 9/2019 | Zhao et al. |
| 10,567,752 | B2 | 2/2020 | Zhao et al. |
| 10,735,720 | B2 * | 8/2020 | Lee .................. H04N 19/10 |
| 2013/0003856 | A1 | 1/2013 | Saxena et al. |
| 2014/0079332 | A1 | 3/2014 | Zheng et al. |
| 2014/0219336 | A1 | 8/2014 | Jeon et al. |
| 2015/0023405 | A1 | 1/2015 | Joshi et al. |
| 2015/0364158 | A1 | 12/2015 | Gupte et al. |
| 2016/0212446 | A1 | 7/2016 | Liu et al. |
| 2016/0330481 | A1 | 11/2016 | Zhang et al. |
| 2017/0094285 | A1 | 3/2017 | Said et al. |
| 2017/0155925 | A1 * | 6/2017 | Li .................. H04N 19/593 |
| 2017/0272745 | A1 | 9/2017 | Lie et al. |
| 2017/0272759 | A1 | 9/2017 | Seregin et al. |
| 2017/0280162 | A1 | 9/2017 | Zhao et al. |
| 2017/0324643 | A1 | 11/2017 | Seregin et al. |
| 2017/0347093 | A1 | 11/2017 | Yu et al. |
| 2017/0353730 | A1 | 12/2017 | Liu et al. |
| 2017/0374369 | A1 | 12/2017 | Chuang et al. |
| 2018/0098064 | A1 | 4/2018 | Seregin et al. |
| 2018/0213224 | A1 | 7/2018 | Son et al. |
| 2018/0262763 | A1 * | 9/2018 | Seregin .................. H04N 19/463 |
| 2018/0332289 | A1 | 11/2018 | Huang et al. |
| 2018/0367814 | A1 * | 12/2018 | Seregin .................. H04N 19/463 |
| 2019/0068976 | A1 | 2/2019 | Yamori |
| 2019/0082183 | A1 | 3/2019 | Shih et al. |
| 2019/0089952 | A1 | 3/2019 | Liu et al. |
| 2019/0110045 | A1 | 4/2019 | Zhao et al. |
| 2019/0158828 | A1 | 5/2019 | Chang et al. |
| 2019/0174128 | A1 | 6/2019 | Jang et al. |
| 2019/0208200 | A1 | 7/2019 | Galpin et al. |
| 2019/0253706 | A1 | 8/2019 | Zhao et al. |
| 2020/0045308 | A1 | 2/2020 | Panusopone et al. |
| 2020/0195921 | A1 | 6/2020 | Van der Auwera et al. |
| 2020/0296363 | A1 | 9/2020 | Yang et al. |
| 2020/0322601 | A1 | 10/2020 | Ko et al. |
| 2020/0374530 | A1 | 11/2020 | Racape et al. |
| 2020/0382772 | A1 | 12/2020 | Hsu |
| 2021/0120239 | A1 | 4/2021 | Zhu et al. |

FOREIGN PATENT DOCUMENTS

| | | |
|---|---|---|
| WO | WO 2017/190288 A1 | 11/2017 |
| WO | 2017/222326 A1 | 12/2017 |
| WO | WO 2018/070267 A1 | 4/2018 |
| WO | 2018/127624 | 7/2018 |
| WO | 2018/205950 A1 | 11/2018 |
| WO | 2019/222042 A1 | 11/2019 |
| WO | 2020/103931 A1 | 5/2020 |

OTHER PUBLICATIONS

Rickard Sjöberg et. al, "Description of SDR and HDR video coding technology proposal by Ericsson and Nokia", JVET-J0012, Joint Video Exploration Team (JVET) of ITU-T SG 16 WP 3 and ISO/IEC JTC 1/SC 29/WG 11, 10th Meeting: San Diego, CA, USA, Apr. 10-20, 2018.
X. Zhang, et al, "Intra mode coding in HEVC standard", Visual Communications and Image Processing (VCIP), 2012 IEEE.
S. Liu; X. Zhang; S. Lei, "Rectangular partitioning for Intra prediction in HEVC", Visual Communications and Image Processing (VCIP), IEEE, Jan. 2012.
X. Zhang, et al, "Non-CE6: Intra mode coding with fixed length binarization", Joint Collaborative Team on Video Coding (JCT-VC) of ITU-T SG16 WP3 and ISO/IEC JTC1/SC29/WG11, 8th Meeting, JCTVC-H0435, pp. 1-5.
S. Liu, X. Zhang, S. Lei, "Rectangular (2N×N and N×2N) Intra Prediction", JCTVC-G0135, Joint Collaborative Team on Video Coding (JCTVC), of ITU-T SG 16 WP 3 and ISO/IEC JTC 1/SC 29/WG 11, Geneva, Nov. 2011.
Foreign Priority Document EP18305586.2 filed May 14, 2018 for WO2019/22042 (Year: 2018).
International Search Report and Written Opinion dated Jul. 8, 2019 in corresponding PCT Application No. PCT/IB2019/051571 (7 pages).
Li et al., "Intra Prediction Using Multiple Reference Lines For Video Coding," Apr. 4-7, 2017, IEEE (Year 2017)(10 pages).
The extended European search report dated Feb. 25, 2021 in corresponding European Patent Application No. 19751262.7 (8 pages).
Zhao et al., "Further investigations on multi-line intra prediction", Joint Video Exploration Team (JVET) of ITU-T SG 16 WP 3 and ISO/IEC JTC 1/SC 29/WG 11, $10^{th}$ Meeting: San Diego, US, Apr. 10-20, 2018, XP030151255, Retrieved from the Internet: URL:http://phenix.int-evry.fr/jvet/doc_end_user/documents/10_San%20Diego/wg11/JVET-J0065-vl.zip JVET-J0065.docx (3 pages).
Korean Office Action dated May 31, 2022 in Application No. 10-2020-7030212 with English Translation.
Jianle Chen, et al. Algorithm Description of Joint Exploration Test Model 7 (JEM7), Joint Video Exploration Team (JVET) of ITU-T SG 16 WP 3 and ISO/IEC JTC 1/SC 29/WG 11, 7th Meeting: Torino, IT, Jul. 13-21, 2017, JVET-G1001, Aug. 19, 2017, pp. 1-50.
Shohei Matsuo et al., Improved intra angular prediction by DCT-based interpolation filter, 2012 Proceedings of the 20th European Signal Processing Conference, Bucharest, Romania, Aug. 27-31, 2012, pp. 1-5.
Chinese Office Action dated Jul. 5, 2022 in Application No. 201980025792.9 with English Translation.
Richard Sjöberg, et al. Description of SDR and HDR video coding technology proposal by Ericsson and Nokia, Joint Video Exploration Team (JVET) of ITU-T SG 16 WP3 and ISO/IEC JTC1/SC29/WG11 10th Meeting, JVETJ0012-v2, Apr. 13, 2018. pp. 1-32.
Office Action dated Oct. 12, 2021, in Japanese Patent Application No. 2020-565035 (with English-language translation) (11 pages).
Jiahao Li, et al., "Multiple line-based intra prediction", Joint Video Exploration Team (JVET) of ITU-T SG 16 WP 3 and ISO/IEC JTC 1/SC 29/WG 11, Document: JVET-C0071, $3^{rd}$ Meeting, May 26-Jun. 1, 2016, (6 pages).
Yao-Jen Chang, et al., "EE6: Arbitrary Reference Tier for Intra Directional Modes, with Supplementary Results", Joint Video Exploration Team (JVET) of ITU-T SG 16 WP 3 and ISO/IEC JTC 1/SC 29/WG 11, Document: JVET-D0099r2, $4^{th}$ Meeting, Oct. 15-21, 2016, (6 pages).
Yao-Jen Chang, et al., "Arbitrary reference tier for intra directional modes", Joint Video Exploration Team (JVET) of ITU-T SG 16 WP 3 and ISO/IEC JTC 1/SC 29/WG 11, Document: JVET-C0043r1, $3^{rd}$ Meeting, May 26-Jun. 1, 2016, (5 pages).

* cited by examiner

METHOD AND APPARATUS FOR INTRA PREDICTION FOR NON-SQUARE BLOCKS IN VIDEO COMPRESSION

INCORPORATION BY REFERENCE

This present application is a continuation of and claims priority to U.S. application Ser. No. 16/752,342, filed Jan. 24, 2020, which is a continuation of U.S. application Ser. No. 16/147,533, filed Sep. 28, 2018, now U.S. Pat. No. 10,567,752, which claims the benefit of priority to U.S. Provisional Application No. 62/693,046, "INTRA PREDICTION FOR SQUARE AND NON-SQUARE BLOCKS IN VIDEO COMPRESSION" filed on Jul. 2, 2018, each of which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In Intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used in as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer bits are required at a given quantization step size to represent the block after entropy coding.

Traditional intra coding such as known from, for example MPEG-2 generation coding technologies does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), benchmark set (BMS). A predictor block can be formed using neighboring samples values belonging to already available samples. Sample values of neighboring samples are copied into the predictor block according to a direction. A reference to the direction in use can be coded in the bitstream or may itself be predicted.

The number of possible directions has increased as video coding technology developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can be sometimes be predicted from neighboring directions used in neighboring, already decoded, blocks.

The mapping of an intra prediction directions bits in the coded video bitstream that represent the direction can be different form video coding technology to video coding technology; and can range, for example, from simple direct mappings of prediction direction to intra prediction mode to codewords, to complex adaptive schemes involving most probably modes and similar techniques. A person skilled in the art is readily familiar with those techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Conventional intra prediction does not take into account wide angular directions that could be useful for non-square blocks. Furthermore, in conventional intra prediction, all intra prediction modes share a same intra smoothing filter, which may not be efficient for wide angles. Additionally, for the luma and chroma component, the neighbouring samples used for intra prediction sample generations are filtered before the generation process. The filtering is controlled by a given intra prediction mode and block size, and the average of a width and height is used to denote the block size. However, the intra prediction may be performed from the above side or left side, and thus, it is not optimal to always use the average of the width and height of the block as the block size.

SUMMARY

According to an embodiment of the present disclosure, there is provided a method for video decoding includes determining, for a current block that is a non-square block, whether an angular intra prediction mode for the current block is a wide angle mode that is in a direction outside of a range of directions that spans a bottom left diagonal direction and top right diagonal direction of the current block; in response to determining that the angular intra prediction mode is the wide angle mode, determining whether a condition to apply an intra smoothing filter to blocks neighboring the current block is satisfied; in response to determining that the condition is satisfied, applying the intra smoothing filter to the blocks neighboring the current block; and performing intra prediction based on the filtered blocks to obtain a characteristic value for the current block.

According to an embodiment of the present disclosure, there is provided a video decoder for video decoding that includes processing circuitry configured to determine, for a current block that is a non-square block, whether an angular intra prediction mode for the current block is a wide angle mode that is in a direction outside of a range of directions that spans a bottom left diagonal direction and top right diagonal direction of the current block, in response to determining that the angular intra prediction mode is the wide angle mode, determine whether a condition to apply an intra smoothing filter to blocks neighboring the current block is satisfied, in response to determining that the condition is satisfied, applying the intra smoothing filter to the blocks neighboring the current block, and perform intra prediction based on the filtered blocks to obtain a characteristic value for the current block.

According to an embodiment of the present disclosure, there is provided a non-transitory computer readable medium including instructions stored therein, which when executed by a processor in a video decoding apparatus, causes the processor to execute a method that includes determining, for a current block that is a non-square block, whether an angular intra prediction mode for the current block is a wide angle mode that is in a direction outside of a range of directions that spans a bottom left diagonal direction and top right diagonal direction of the current block; in response to determining that the angular intra prediction mode is the wide angle mode, determining whether a condition to apply an intra smoothing filter to blocks neighboring the current block is satisfied; in response to determining that the condition is satisfied, applying the intra smoothing filter to the blocks neighboring the current block; and performing intra prediction based on the filtered blocks to obtain a characteristic value for the current block.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
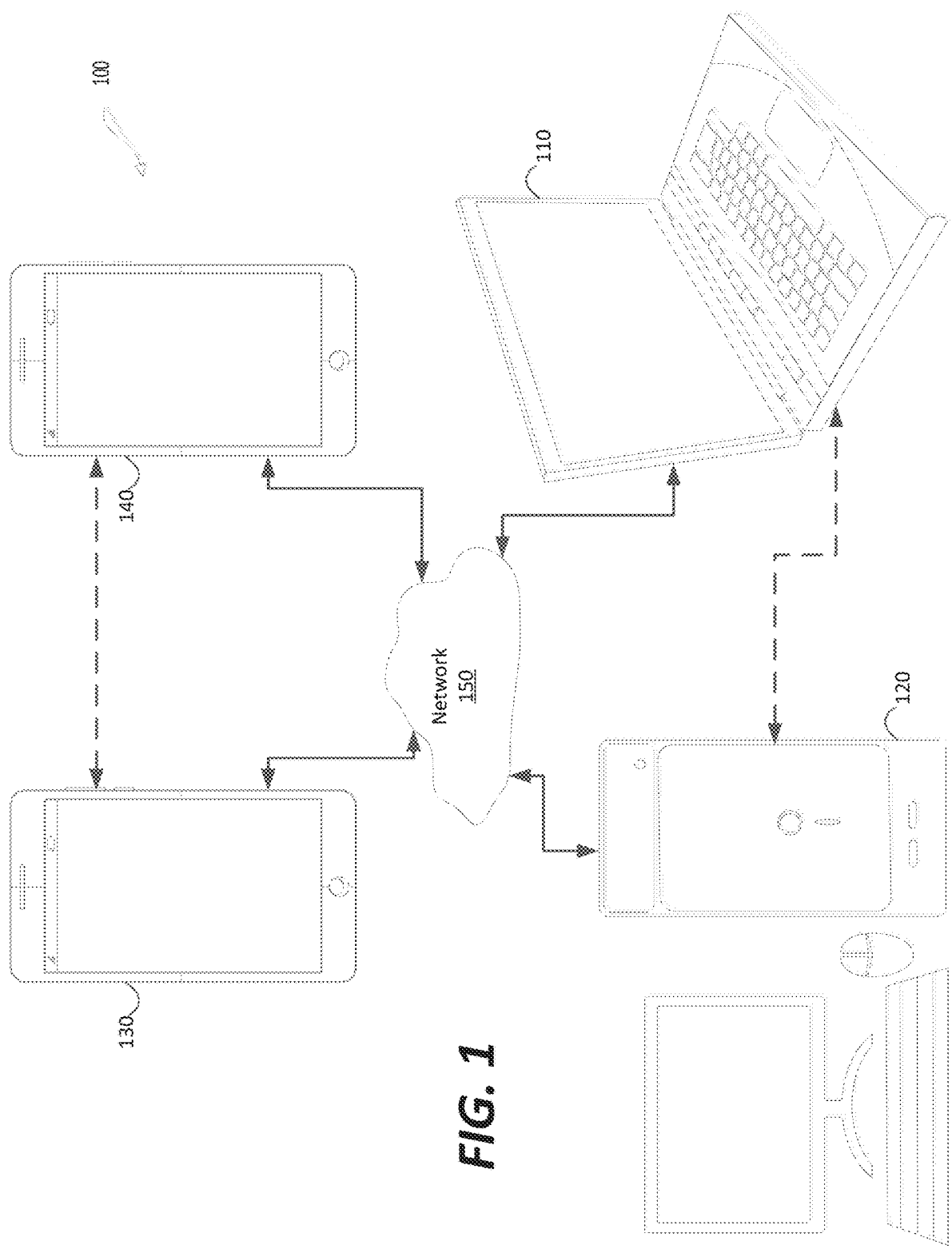
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data.

Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
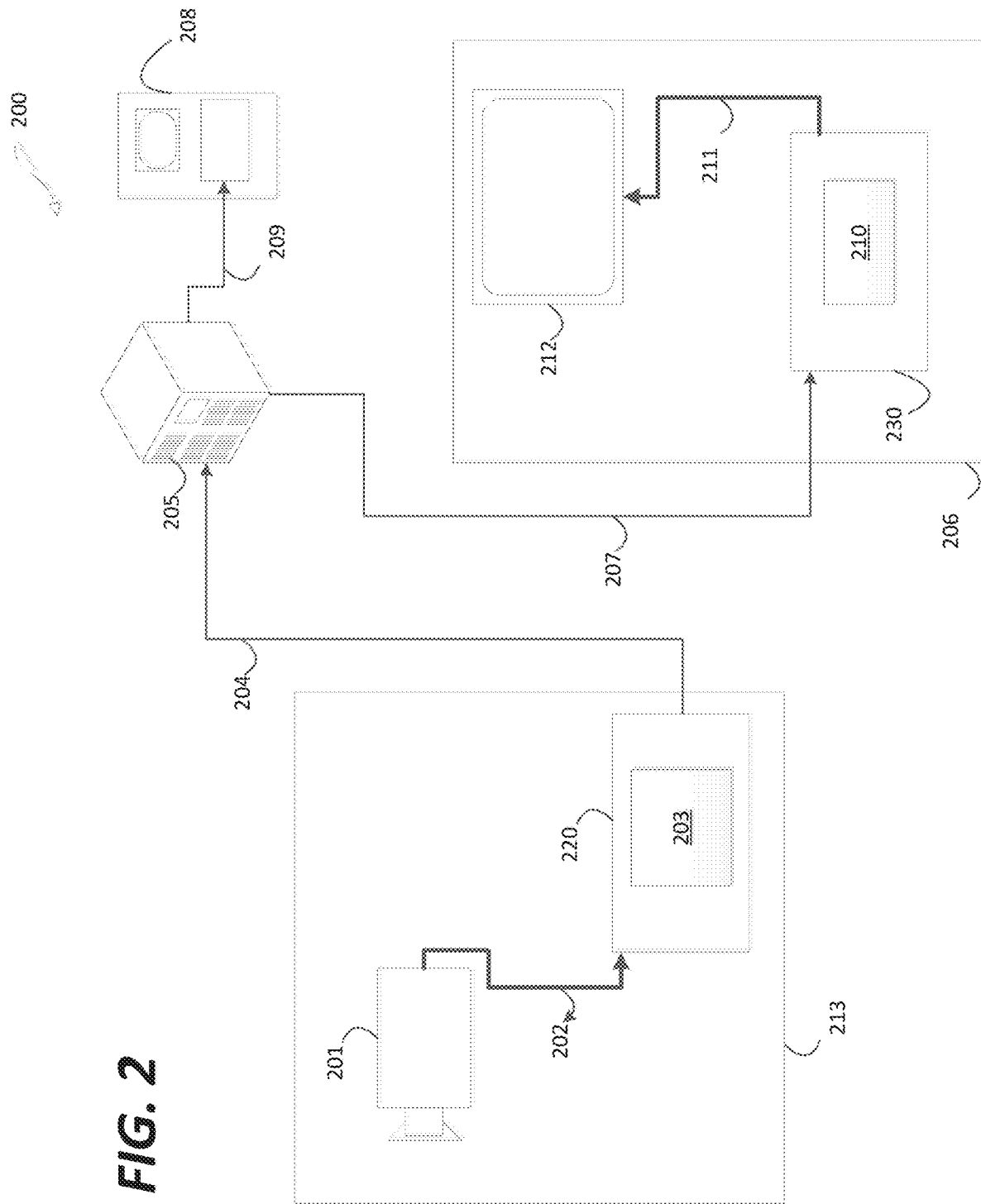
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
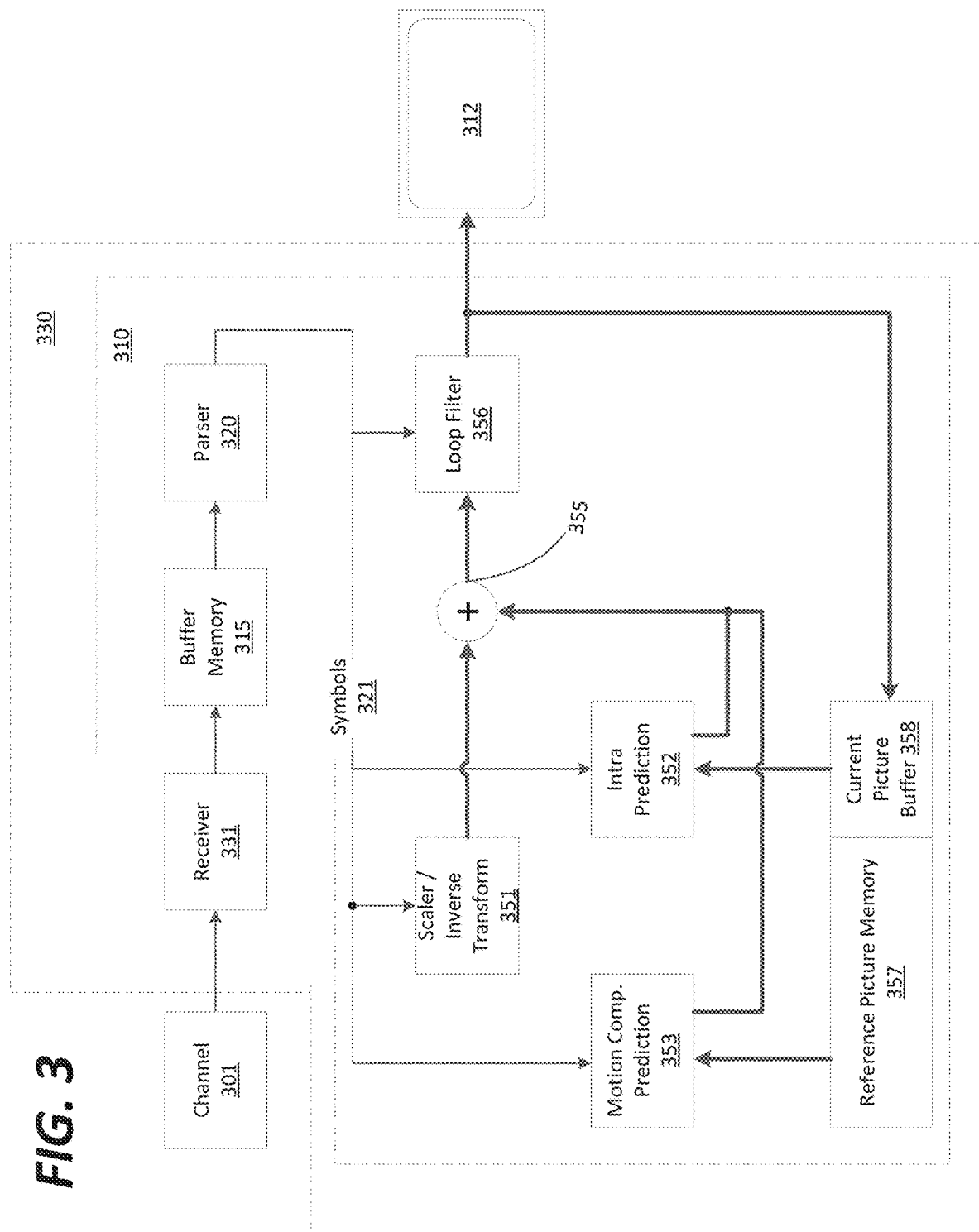
FIG. 3 is a schematic illustration of a simplified block diagram of a decoder in accordance with an embodiment.

FIG. 3) shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplementary Enhancement Information (SEI messages) or Video Usability Information (VUI) parameter set fragments (not depicted). The parser (320)

may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select a certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
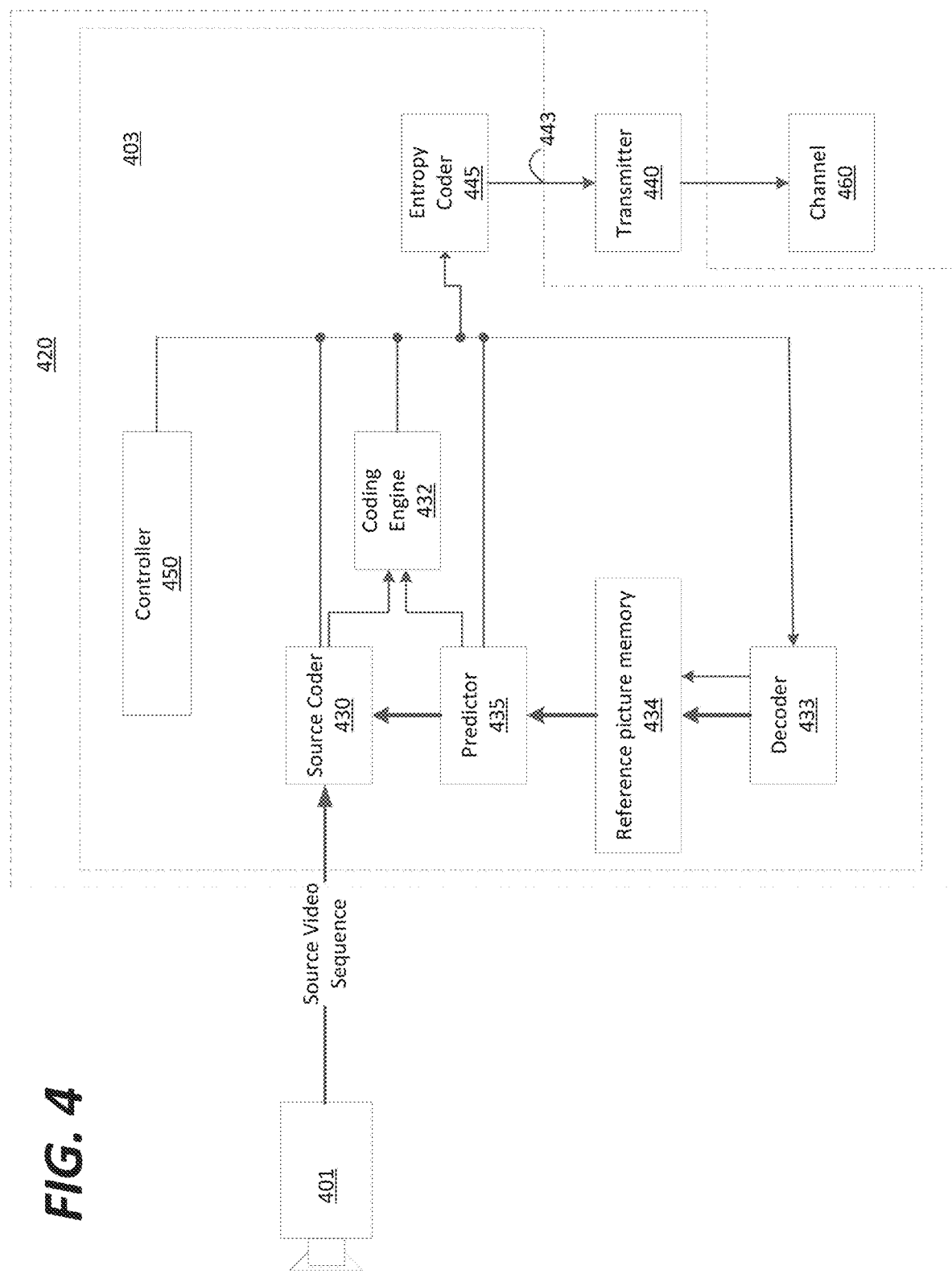
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401)(that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focusses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

A video may be captured as a plurality of source pictures (video pictures) in a temporal sequence. Intra-picture prediction (often abbreviated to Intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency. In the merge mode, a block in the current picture can inherit motion vectors of a neighboring block (e.g., that shares a boundary with the block, is disposed in a larger partition region with the block) in the current picture.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 5:
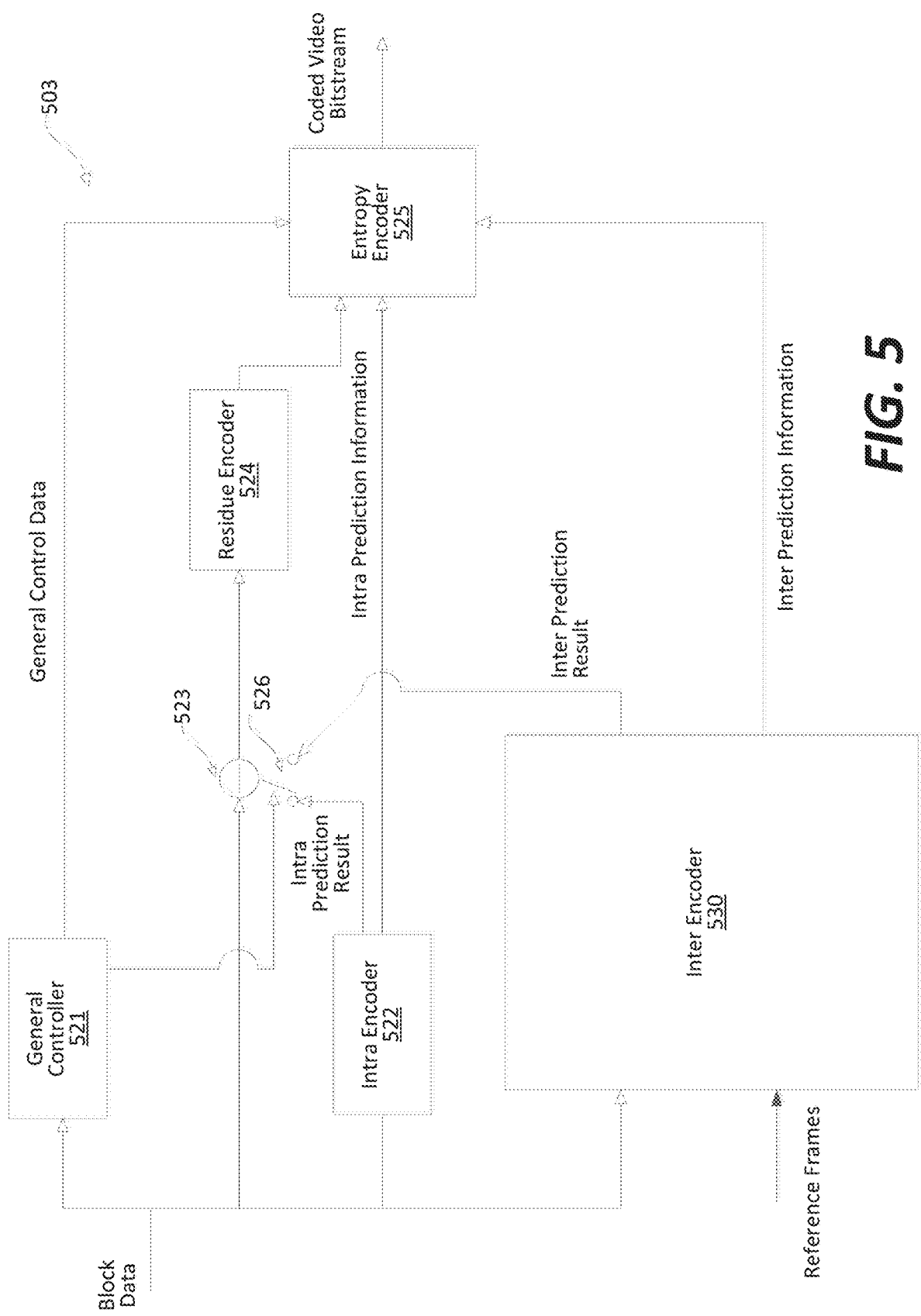
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521) and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques).

The general controller (521) is configured to determine general control data and control other components of the video encoder (503) based on the general control data. In an example, the general controller (521) determines the mode of the block, and provides a control signal to the switch (526) based on the mode. For example, when the mode is the intra, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data in the frequency domain, and generate the transform coefficients. The transform coefficients are then subject to quantization processing to obtain quantized transform coefficients.

The entropy encoder (525) is configured to format the bitstream to include the encoded block. The entropy encoder (525) is configured to include various information according to a suitable standard, such as HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
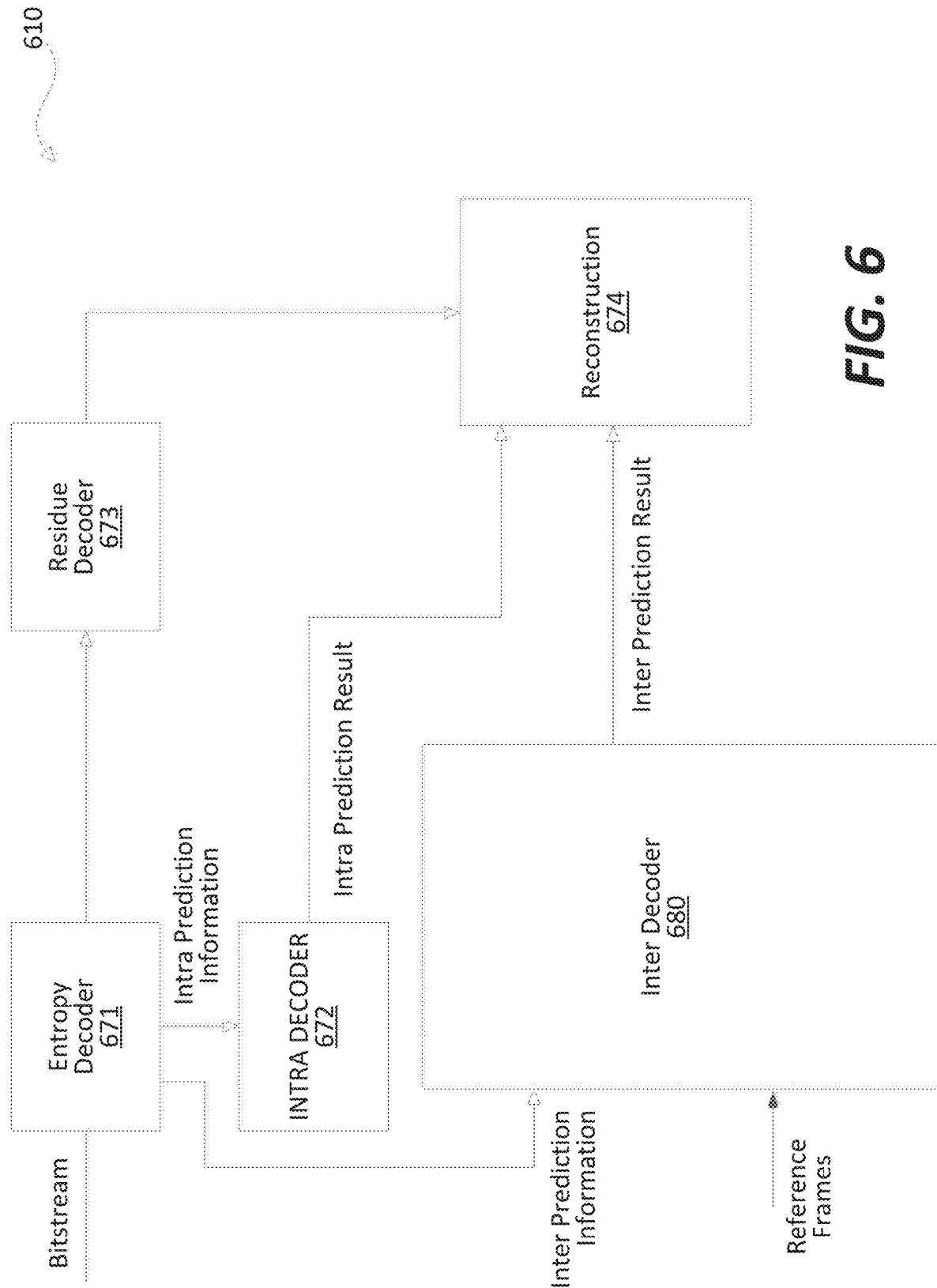
FIG. 6 shows a block diagram of a decoder in accordance with another embodiment.

FIG. 6 shows a diagram of a video decoder (610) according to another embodiment of the disclosure. The video decoder (610) is configured to receive a coded pictures that are part of a coded video sequence, and decode the coded picture to generate a reconstructed picture. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra, inter, b-predicted, the latter two in merge submode or another submode), prediction information (such as, for example, intra prediction information or inter prediction information) that can identify certain sample or metadata that is used for prediction by the intra decoder (672) or the inter decoder (680) respectively residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter QP), and that information may be provided by the entropy decoder (671) (datapath not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403) and (503), and the video decoders (210), (310) and (610) can be implemented using any suitable technique. In an embodiment, the video encoders (203), (403) and (503), and the video decoders (210), (310) and (610) can be implemented using one or more integrated circuits. In another embodiment, the video encoders (203), (403) and (403), and the video decoders (210), (310) and (610) can be implemented using one or more processors that execute software instructions.

Figure 7:
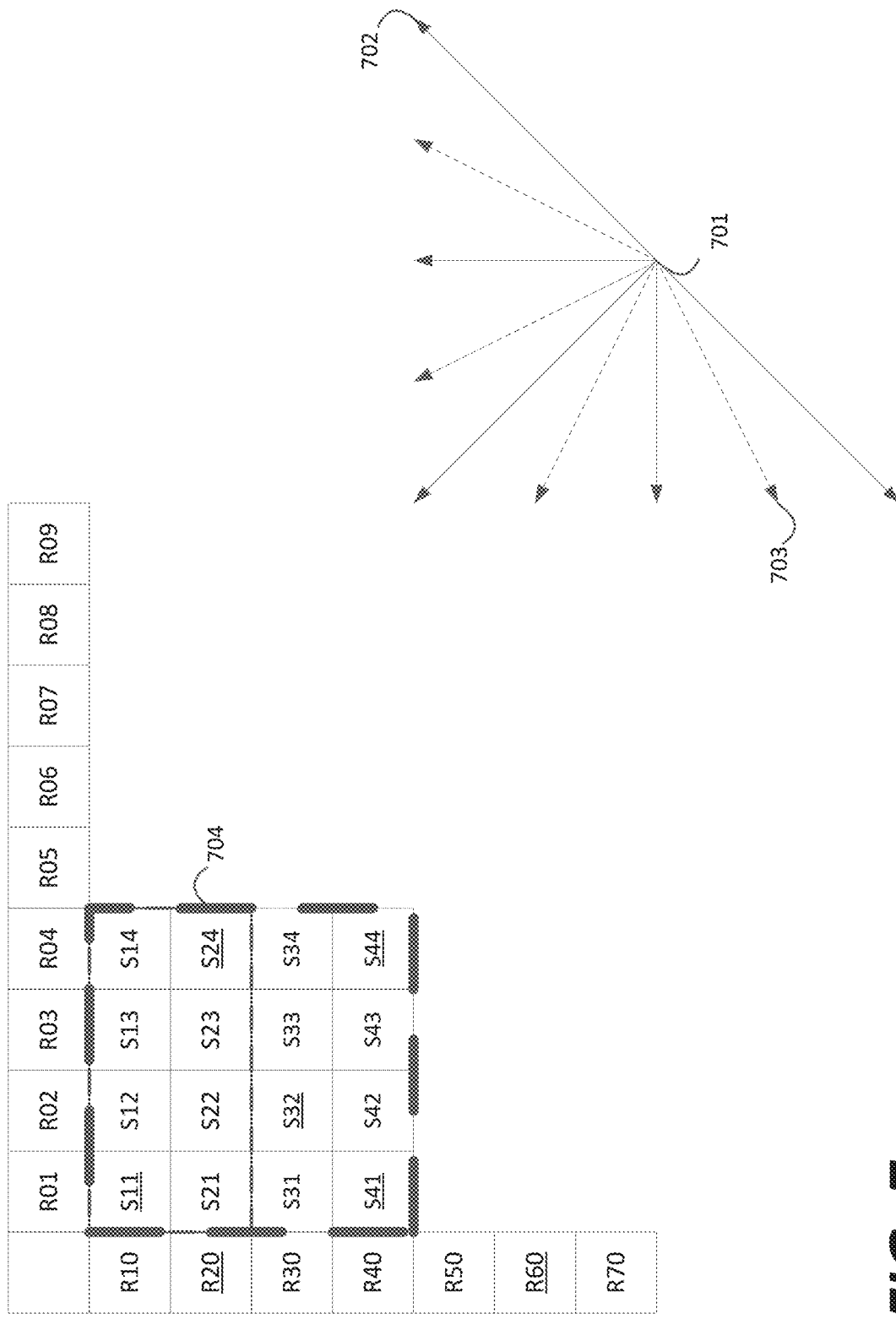
FIG. 7 is a schematic illustration of exemplary intra prediction modes.

FIG. 7 illustrates an embodiment of exemplary angular modes used for intra prediction. In FIG. 7, depicted in the lower right is an example of nine prediction directions, which may be from H.265's 35 possible prediction directions. The point where the arrows converge (701) represents the sample being predicted. The arrows represent the direction from which the sample is being predicted. For example, arrow (702) indicates that sample (701) is predicted from a sample or samples to the upper right, at a 45 degree angle from the horizontal axis. Similarly, arrow (703) indicates that sample (701) is predicted from a sample or samples to the lower left of sample (701), in a 22.5 degree angle from the horizontal axis.

Still referring to FIG. 7, on the top left there is depicted a square block (704) of 4×4 samples (indicated by a dashed, boldface line). The square block (704) includes 16 samples, each labelled with an "S", its position in the Y dimension (e.g., row index), and its position in the X dimension (e.g., column index). For example, sample S21 is the second sample in the Y dimension (from the top) and the first (from the left) sample in the X dimension. Similarly, sample S44 is the fourth sample in block (704) in both the Y and X dimension. As the block is 4×4 samples in size, S44 is at the bottom right. Further shown are reference samples, that follow a similar numbering scheme. A reference sample is labelled with an R, its Y position (e.g., row index) and X position (column index) relative to block (704). Intra picture prediction can work by copying reference sample values from the neighboring samples as appropriated by the signaled prediction direction. For example, assume the coded video bitstream includes signaling that, for this block, indicates a prediction direction consistent with arrow (702)—that is, samples are predicted from prediction sample or samples to the upper right, at a 45 degree angle from the horizontal. In that case, samples S41, S32, S23, and S14 are predicted from same R05. Sample S44 is then predicted from R08.

In certain cases, the values of multiple reference samples may be combined, for example through interpolation, in order to calculate a reference sample; especially when the directions are not evenly divisible by 45 degrees.

Figure 8:
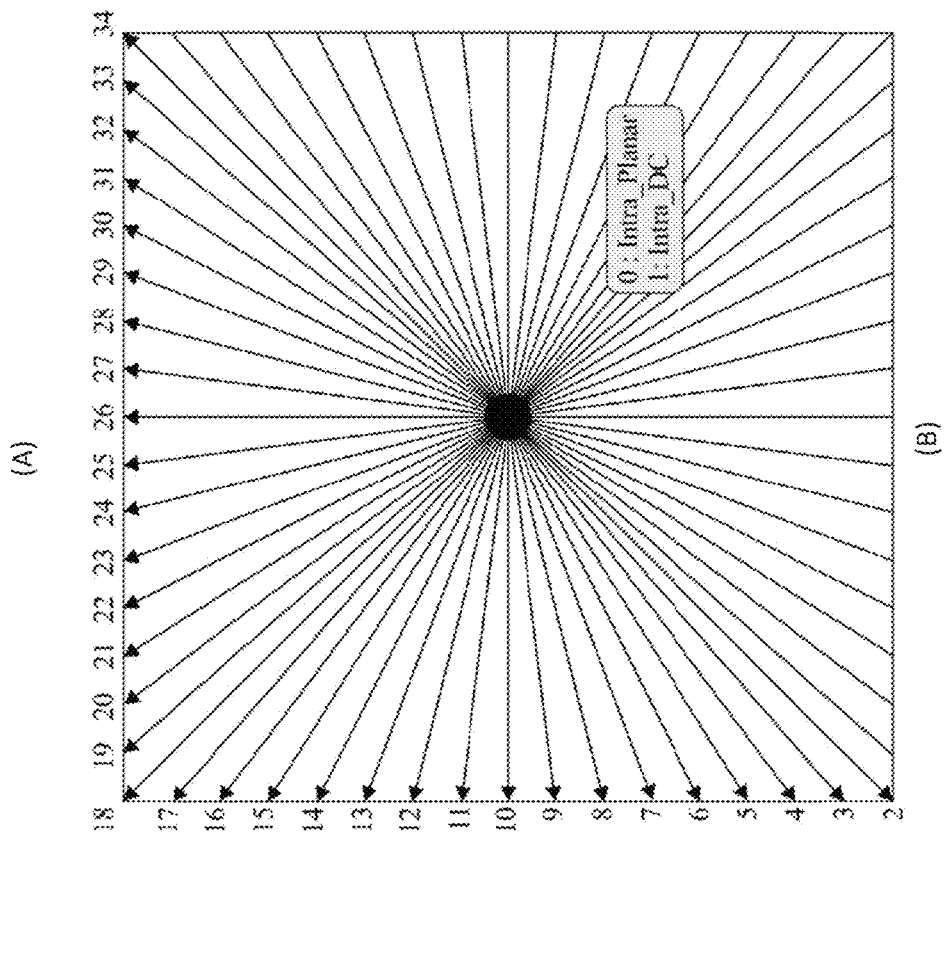
FIGS. 8(A) and (B) illustrate the various angular modes for 35 prediction modes.

FIGS. 8(A) and (B) illustrate an embodiment of 35 total intra prediction modes including 33 angular modes. Mode 0 is the INTRA_PLANAR mode, and mode 1 is the INTRA_DC mode. Furthermore, Modes 2-34 represent the intra angular modes. As understood by one of ordinary skill in the art, the bottom-left diagonal mode is mode 2, the top-right diagonal mode is mode 34, mode 10 is the horizontal angular mode, and mode 26 is the vertical mode.

Figure 9:
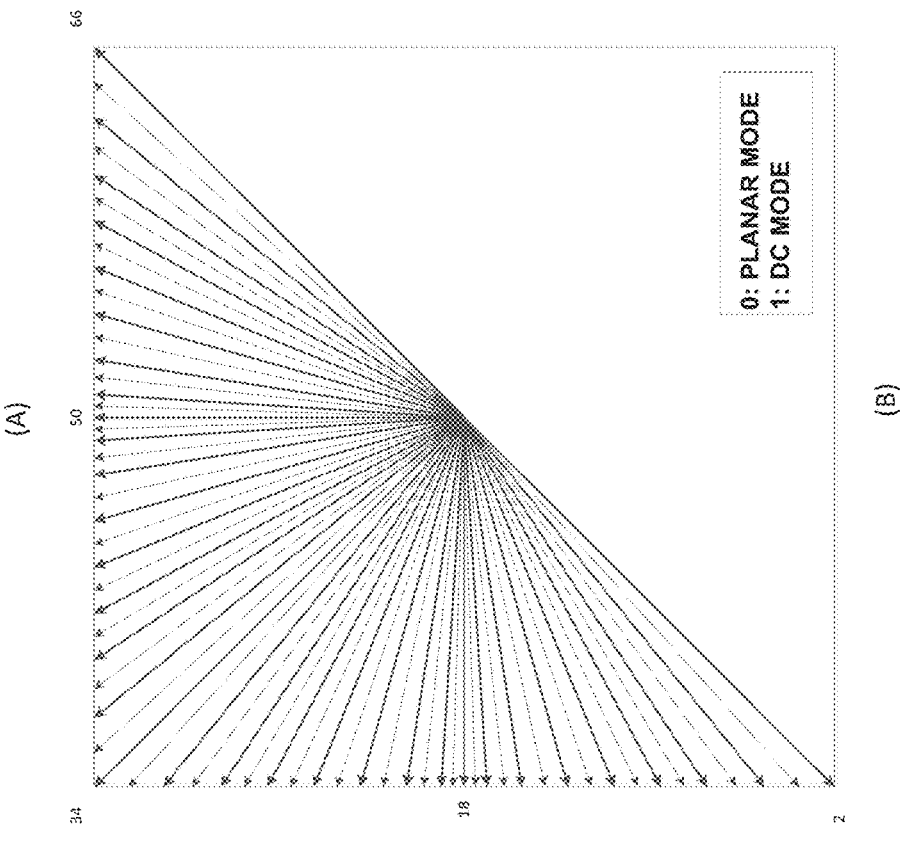
FIGS. 9(A) and (B) illustrate the various angular modes for 67 prediction modes.

FIGS. 9(A) and (B) illustrate an embodiment of 67 total intra prediction modes including 65 angular modes. Mode 0 is the INTRA_PLANAR mode, and mode 1 is the INTRA_DC mode. Furthermore, Modes 2-66 represent intra angular modes INTRA_ANGULAR2-INTRA_ANGULAR66, respectively. As understood by one of ordinary skill in the art, mode 18 is the horizontal mode, and mode 50 is the vertical mode.

Figure 10:
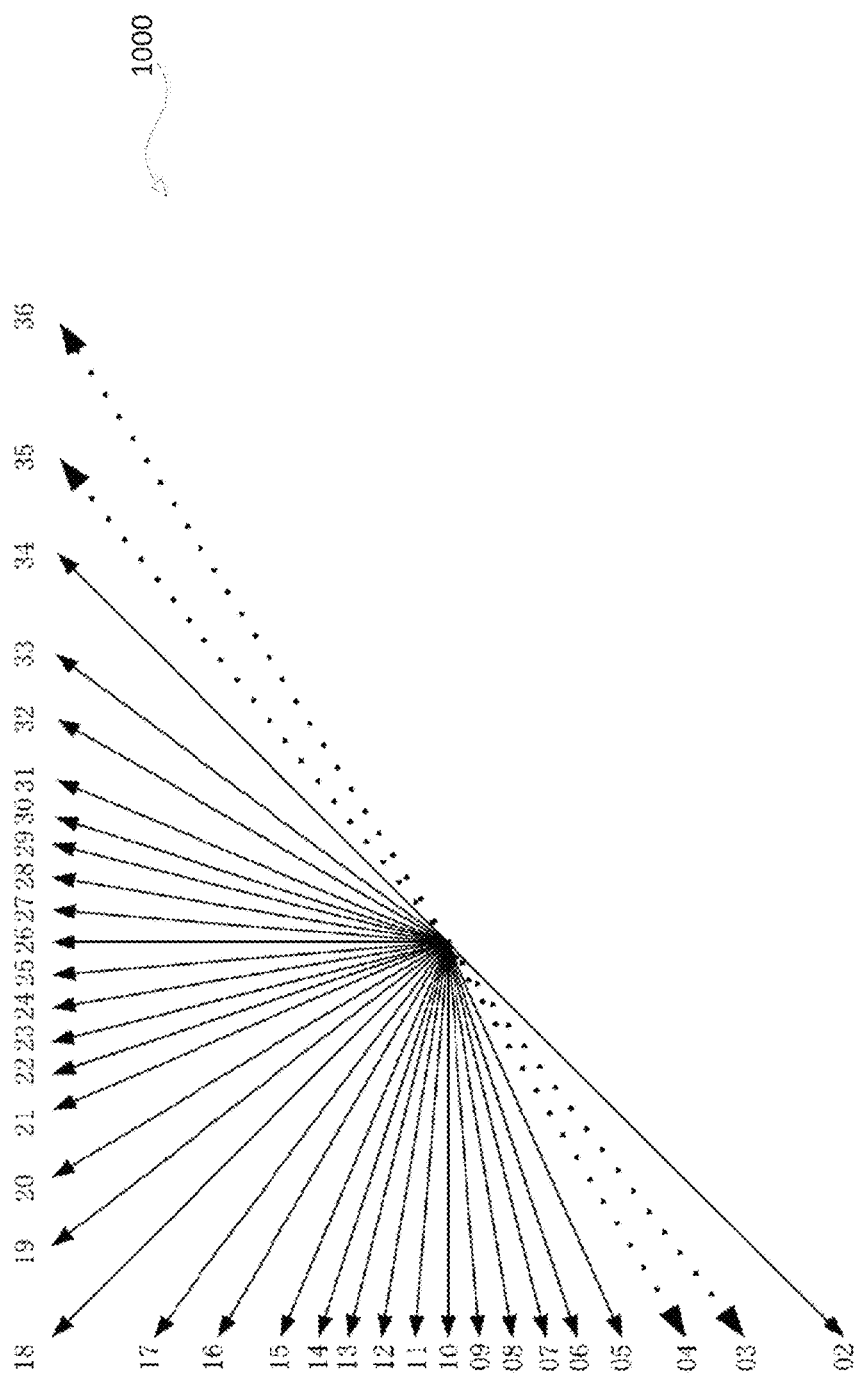
FIG. 10 illustrates exemplary wide angular prediction modes.

FIG. 10 illustrates a block 1000 with wide angular modes. For example, in FIG. 10, modes 2 to 34 are intra prediction modes 180 degrees apart between a top-right and bottom-left diagonal direction, which may be called conventional intra prediction modes. The block 1000 may further include wide angular intra prediction modes that are beyond the range of prediction directions covered by conventional intra prediction modes. For example, modes 35 and 36 in block 1000 are wide angular intra prediction modes. Each wide angular intra prediction mode may be associated with one conventional intra prediction mode, where each wide-angular intra prediction mode and its associated intra prediction mode capture the same direction, but using the reference samples at opposite sides (left column or top row). The wide angular intra prediction mode and associated conventional intra prediction mode may be spaced apart from each other by 180 degrees. For example, wide angular intra prediction mode 35 is associated with conventional angular intra prediction mode 3. Similarly, wide angular intra prediction mode 36 is associated with conventional intra prediction mode 4.

According to some embodiments, the wide angular intra prediction mode may be signaled by sending a 1-bit flag for those associated directions that have an available wide angle "flip mode." For example, in FIG. 10, mode 3 and mode 4 would have flags indicating whether to use the indicated conventional intra prediction mode or flipped wide angular direction mode 35 and mode 36, respectively.

In some embodiments, when a block has 65 angular intra prediction modes, the availability of the new modes may be limited to the 10 directional modes closest to the 45-degree diagonal top-right mode (i.e., mode 34 when 35 conventional intra modes are applied) and bottom-left mode (i.e., mode 2 when 35 conventional intra modes are applied). The sample prediction process disclosed in the HEVC standard or VVC standard may be used.

According to some embodiments, for the luma component, the neighboring samples used for intra prediction sample generations are filtered before the generation process. The filtering may be controlled by the given intra prediction mode and transform block size. In some embodiments, if the intra prediction mode is DC or the transform block size is equal to 4×4, neighboring samples are not filtered. In some embodiments, if the distance between the given intra prediction mode and vertical mode (or horizontal mode) is larger than a predefined threshold, the filtering process is enabled. The threshold may depend on the width (or height) of a block when intra prediction is applied on square blocks. In some embodiments, the threshold depends on the area size of a block, i.e., ($\log_2$(width)+$\log_2$(height)) >>1.

According to some embodiments, whether intra smoothing filter is enabled for wide angular modes may be dependent on the block size. In some embodiments, intra smoothing filtering is always enabled for wide angles with all block sizes. For example, a parameter associated with a block may indicate that intra smoothing filtering may be applied regardless of block size. In some embodiments, intra smooth filtering is enabled for wide angle with certain block sizes and disabled for other block sizes. For example, when a block size of a current block is larger than or equal to a predetermined block size threshold (e.g., 32), the intra smooth filter is disabled for wide angles. If the block size is less than the predetermined block size threshold, the intra smooth filtering is enabled. In some embodiments, the block size of a current block is determined by a width or height of the current block. In some embodiments, the block size of the current block is determined by an average of the width and height of the current block.

According to some embodiments, a coding tool X has a selection of several modes including an intra prediction mode. When a wide angular intra prediction mode is used, and the behavior of mode selection for the coding tool X is not defined or the coding tool X does not support a wide angle intra prediction mode, the wide angle intra prediction mode may be mapped to one of the conventional intra prediction modes. The mapped conventional intra prediction mode may be used to decide the selection of mode for the coding tool X. In some embodiments, a wide angular intra prediction mode is mapped to its associated conventional intra prediction mode. For example, the wide angular intra prediction mode 35 is mapped to conventional intra prediction mode 3. Similarly, the wide angular intra prediction mode 36 is mapped to conventional intra prediction mode 4.

In some embodiments, the wide angular intra prediction mode is mapped to a nearest conventional intra prediction mode. For example, wide angular intra prediction modes 35, 36, 37, and 38 may be mapped to conventional intra prediction mode 34, and wide angular intra prediction modes −1, −2, −3, and −4 may be mapped to conventional intra prediction mode 2. In another example, when there are 65 conventional angular intra prediction modes, wide angular intra prediction modes 67 to 74 may be mapped to conventional intra prediction mode 66, and wide angular intra prediction modes −1 to −8 may be mapped to conventional intra prediction mode 2.

In some embodiments, the coding tool X may be a tool such as, but not limited to, Position Dependent Prediction Combination (PDPC), Adaptive Multiple Transform (AMT), Non-Separable Secondary Transform (NSST), and Prediction dependent transform.

Figure 11:
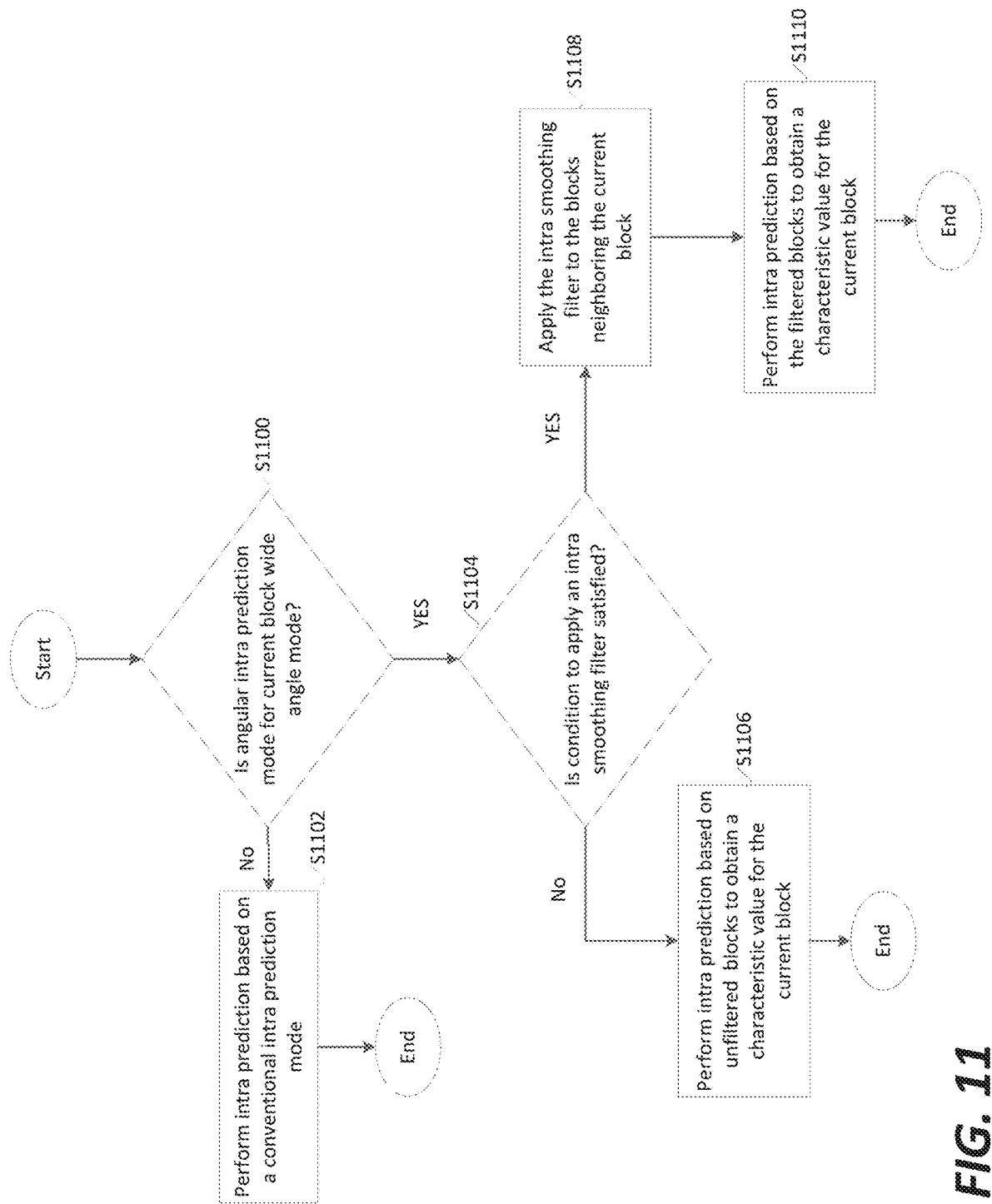
FIG. 11 illustrates an embodiment of a process performed by an encoder or decoder.

FIG. 11 illustrates an embodiment of a process performed by an encoder or decoder such as intra encoder 522 or intra decoder 672, respectively. The process illustrated in FIG. 11 may be performed for non-square blocks. The process may start at step S1100 where it is determined whether an angular intra prediction mode for the current block is a wide angle mode. As discussed above, the wide angle mode includes directions outside of a range of directions that spans a bottom left diagonal direction and top right diagonal direction of the current block. For example, when there are 33 conventional angular intra prediction modes, an angular mode number greater than 34 or a negative angular mode number indicates that the angular intra prediction mode for the current block is the wide angle mode. Similarly, when there are 65 conventional angular intra prediction modes, an angular mode number greater than 66 or a negative angular mode number indicates that the angular intra prediction mode for the current block is the wide angle mode. If the angular intra prediction mode is not a wide angle mode, the process proceeds to step S1102 ("No") to perform intra prediction for the current block based on a conventional intra prediction mode.

If the angular intra prediction mode is the wide angle mode, the process proceeds to step S1104 ("Yes"), to determine whether a condition to apply an intra smoothing filter to blocks neighboring the current block is satisfied. For example, the condition may be satisfied if a parameter associated with enabling intra smooth filtering indicates that intra smooth filtering is applied regardless of block size. In another example, the condition may be satisfied when a block size of the current block is greater than a predetermined block size threshold, where the block size may be determined in accordance with a height, width, or an average of the height and width of the current block.

If the condition to apply intra smooth filtering is not satisfied, the process proceeds to step S1106 ("No") where intra prediction is performed based on unfiltered blocks to obtain a characteristic value for the current block. However, if the condition to apply intra sooth filtering is satisfied, the process proceeds from step S1104 to step S1108 ("Yes") where the intra smoothing filter is applied to the blocks neighboring the current block. The process proceeds to step S1110 where intra prediction based on the filtered blocks is performed to obtain a characteristic for the current block is performed.

Figure 12:
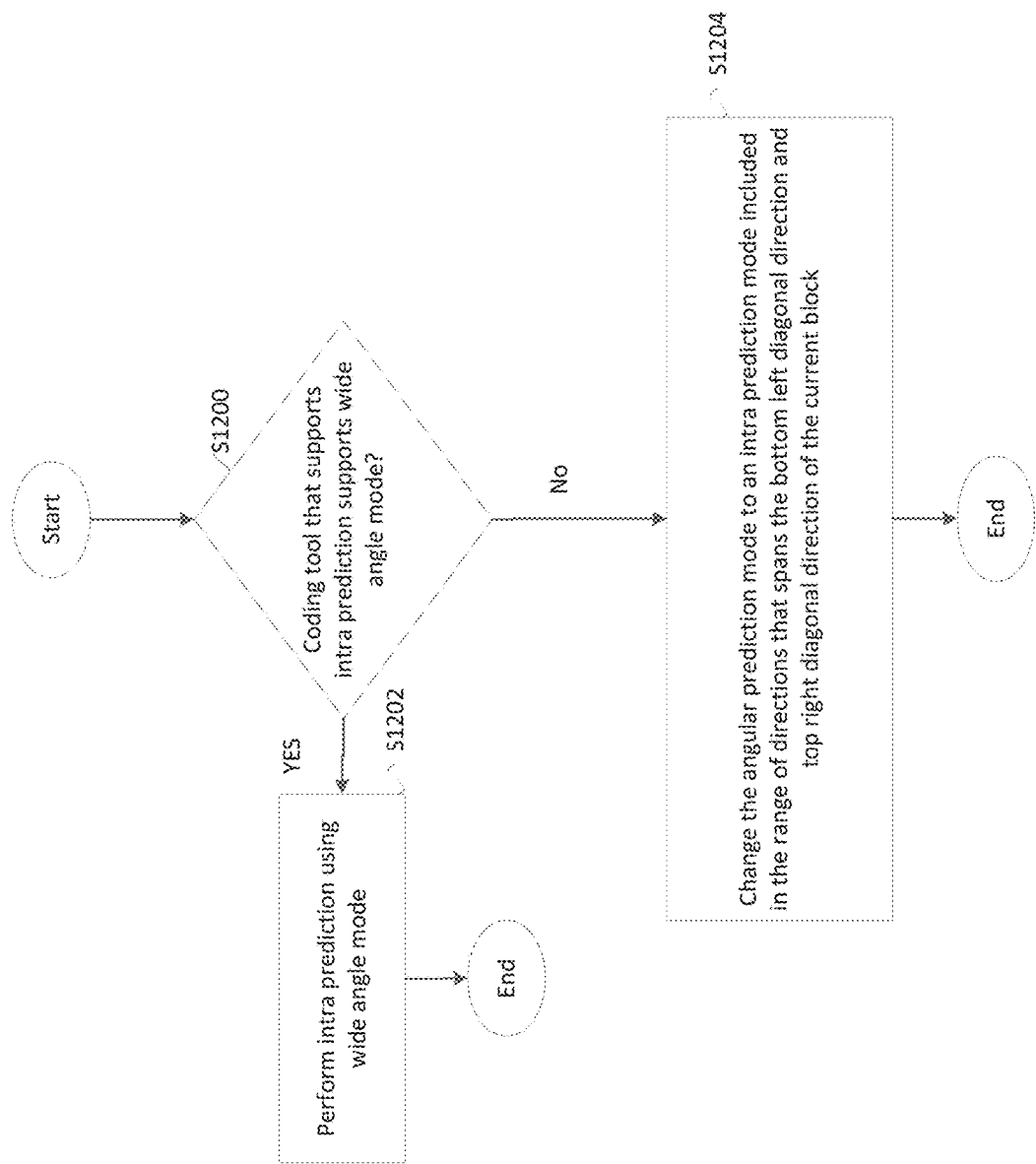
FIG. 12 illustrates an embodiment of a process performed by an encoder or decoder.

FIG. 12 illustrates an embodiment of a process performed by an encoder or decoder such as intra encoder 522 or intra decoder 672, respectively. The process may start at step S1200 where it is determined whether a coding tool that performs intra prediction supports the wide angle mode. If the coding tool supports the wide angle mode, the process proceeds to step S1202 ("Yes") where intra prediction is performed using the wide angle mode. However, if the coding tool does not support the wide angle mode, the process proceeds to step S1204 ("No"), where the angular intra prediction mode is changed to an intra prediction mode included in the range of directions that spans the bottom left diagonal direction and top right diagonal direction of the current block. For example, if the angular intra prediction mode is a wide angle mode, the wide angle mode is mapped to a corresponding conventional intra prediction associated with the wide angle mode, or the wide angle mode is mapped to the nearest conventional intra prediction mode.

According to some embodiments, for determining the condition for intra smoothing filter for angular prediction modes is satisfied, if a current intra prediction mode is a vertical-like direction (e.g., closer to vertical direction than horizontal direction, such as, mode 18-34 when 35 intra modes are applied and mode 34-66 when 67 intra modes are applied), a width of a current block is used to decide whether and which intra smoothing filter is applied. Furthermore, if a current intra prediction is a horizontal-like direction (e.g., closer to horizontal direction than vertical direction, such as mode 2-17 when 35 intra modes are applied, and mode 2-33 when 67 intra modes are applied), a height of the current is used to decide whether and which intra smoothing filter is applied.

For example, when there are 35 intra prediction modes, when the mode index of a current angular direction is equal to or larger than 18, a width of a current block is used to denote the current block size such that the sampling filtering depends only on the prediction mode and block width. Otherwise, when the mode index of the current angular direction is less than 18, a height of the current block is used to denote the current block size such that the sampling filtering depends only on the prediction mode and block height.

In another example, when there are 67 intra prediction modes, when the mode index of a current angular direction is equal to or larger than 34, a width of the current block is used to denote the current block size such that the sampling filtering depends only on the prediction mode and block height. Otherwise, when the mode index of the current angular direction is less than 34, a height of the current block is used to denote the current block size such that the sampling filtering depends only on the prediction mode and block height.

The following embodiments disclose example intra smooth filters.

Inputs to this process are:
the neighbouring samples p[x][y], with x=−1, y=−1 . . . nWidth+nHeight−1 and x=0 . . . nWidth+nHeight−1, y=−1,
a variable nWidth specifying the transform block width.
a variable nHeight specifying the transform block height.

Outputs of this process are the filtered samples pF[x][y], with x=−1, y=−1 . . . nTbS*2−1 and x=0 . . . nTbS*2−1, y=−1.

The variable filterFlag may be derived as follows:
If the following conditions is true, filterFlag is set equal to 0:
  predModeintra is equal to INTRA_DC.
Otherwise, the following applies:
  The variable minDistVerHor is set equal to Min(Abs(predModeintra−26), Abs(predModeintra−10)).
  The variable nTbS may be derived as follows:
    If predMode Intra is less than 34 and larger than DC_IDX, nTbS is set to nHeight
    Else ifpredMode Intra is equal to or larger than 34, nTbS is set to nWidth
    Else, nTbS is set to (nWidth+nHeight)>>1
The variable intraHorVerDistThres[nTbS] is specified in table illustrated below.
The variable filterFlag is derived may be derived as follows:
  IfminDistVerHor is greater than intraHorVerDistThres[nTbS], filterFlag is set equal to 1.
Otherwise, filterFlag is set equal to 0.

The following table illustrates example values for the variable intraHorVerDistThres[nTbs] for various transform block sizes.

|  | nTbS > 4 && nTbS < −8 | nTbS > 8 && nTbS < −16 | nTbS > 16 && nTbS < −32 | nTbS > 32 && nTbS < −64 |
| --- | --- | --- | --- | --- |
| intraHorVerDistThres [nTbS] | 7 | 1 | 0 | 10 |

When filterFlag is equal to 1, the following may apply:
The variable biIntFlag is derived as follows:
  If all of the following conditions are true, biIntFlag is set equal to 1:
    strong_intra_smoothing_enabled_flag is equal to 1
    nTbS is equal to 32
    Abs(p[−1][−1]+p[nTbS*2−1][−1]−2*p[nTbS−1][−1])<(1«(BitDepthy−5))
    Abs(p[−1][−1]+p[−1][nTbS*2−1]−2*p[−1][nTbS−1])<(1 «(BitDepthy−5))

Otherwise, biIntFlag is set equal to 0.
The filtering may be performed as follows:
If biIntFlag is equal to 1, the filtered sample values pF[x][y] with x=−1, y=−1 . . . 63 and x=0 . . . 63, y=−1 are derived as follows:

$$pF[-1][-1]=p[-1][-1] \quad \text{(Eq. 1)}$$

$$pF[-1][y]=((63-y)*p[-1][-1]+(y+1)*p[-1][63]+32)\gg6 \text{ for } y=0 \ldots 62 \quad \text{(Eq. 2)}$$

$$pF[-1][63]=p[-1][63] \quad \text{(Eq. 3)}$$

$$pF[x][-1]=((63-x)*p[-1][-1]+(x+1)*p[63][-1]+32)\gg6 \text{ for } x=0 \ldots 62 \quad \text{(Eq. 4)}$$

$$pF[63][-1]=p[63][-1] \quad \text{(Eq. 5)}$$

Otherwise (biIntFlag is equal to 0), the filtered sample values pF[x][y] with x=−1, y=−1 nTbS*2−1 and x=0 nTbS*2−1, y=−1 may be derived as follows:

$$pF[-1][-1]=(p[-1][9]+2*p[-1][-1]+p[0][-1]+2)\gg2 \quad \text{(Eq. 6)}$$

$$pF[-1][y]=(p[-1][y+1]+2*p[-1][y]+p[-1][y-1]+2)\gg2 \text{ for } y=0 \ldots nThS*2-2 \quad \text{(Eq. 7))}$$

$$pF[-1][nThS*2-1]=p[-1][nTbS*2-1] \quad \text{(Eq. 8)}$$

$$pF[x][-1]=(p[x-1][-1]+2*p[x][-1]+p[x+1][-1]+2)\gg2 \text{ for } x=0 \ldots nThS*2-2 \quad \text{(Eq. 9)}$$

$$pF[nThS*2-1][-l]=p[nThS*2-1][-1] \quad \text{(Eq. 10)}$$

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
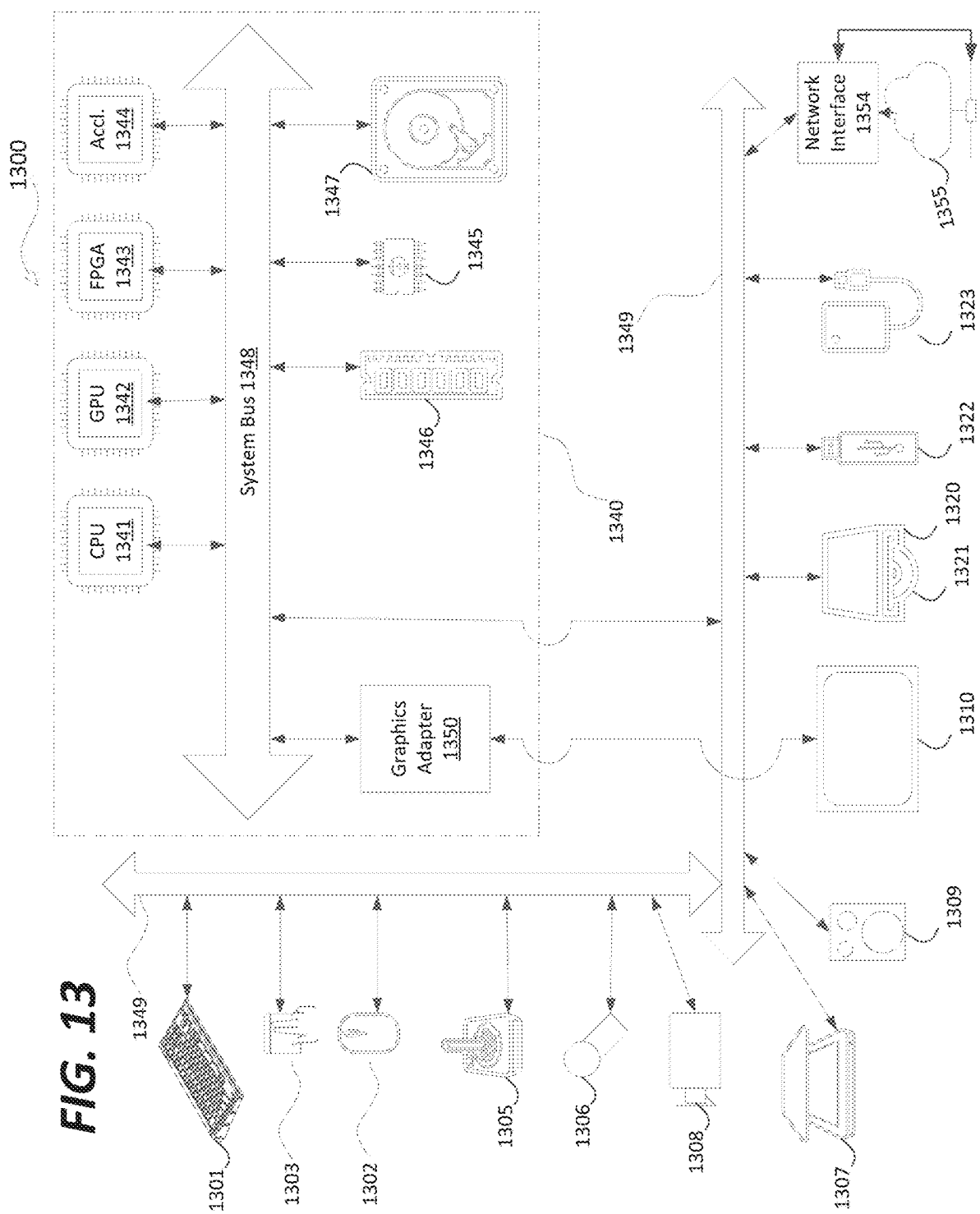
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include a network interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), and so forth. These devices, along with Read-only memory (ROM) (1345), Random-access memory (1346), internal mass storage such as internal non-user accessible hard drives, SSDs, and the like (1347), and Graphics Adapter 1350 may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

(1) A method for video decoding includes determining, for a current block that is a non-square block, whether an angular intra prediction mode for the current block is a wide angle mode that is in a direction outside of a range of directions that spans a bottom left diagonal direction and top right diagonal direction of the current block; in response to determining that the angular intra prediction mode is the wide angle mode, determining whether a condition to apply an intra smoothing filter to blocks neighboring the current block is satisfied; in response to determining that the condition is satisfied, applying the intra smoothing filter to the blocks neighboring the current block; and performing intra prediction based on the filtered blocks to obtain a characteristic value for the current block.

(2) The method according to feature (1), in which the condition indicates that the intra smoothing filter is applied regardless of block size.

(3) The method according to feature (1) or (2), in which the condition is satisfied in response to a determination that a block size of the non-square block is greater than or equal to a block size threshold.

(4) The method according to feature (3), in which the block size is determined in accordance with a height, width, or an average of the height and width of the current block.

(5) The method of any one of features (1)-(4), further including determining whether a coding tool that performs the intra prediction supports the wide angle mode; and in response to the determination that the coding tool does not support the wide angle mode, changing the angular prediction mode from the wide angle mode to an intra prediction mode included in the range of directions that spans the bottom left diagonal direction and top right diagonal direction of the current block.

(6) The method of feature (5), in which the angular prediction mode is changed to an intra prediction mode in the range of directions having a direction that is opposite to a direction of the wide angle mode such that the changed intra prediction mode is 180 degrees from the wide angle mode.

(7) The method of feature (5), in which the angular prediction mode is changed to an intra prediction mode in the range of directions that is nearest to the wide angle mode.

(8) The method according to feature (5), in which the coding tool is selected from a group of coding tools that includes Position Dependent Prediction Combination (PDPC), Adaptive Multiple Transform (AMT), Non-Separable Secondary Transform (NSST), and Prediction dependent transform.

(9) A video decoder for video decoding, including processing circuitry configured to: determine, for a current block that is a non-square block, whether an angular intra prediction mode for the current block is a wide angle mode that is in a direction outside of a range of directions that spans a bottom left diagonal direction and top right diagonal direction of the current block, in response to determining that the angular intra prediction mode is the wide angle mode, determine whether a condition to apply an intra smoothing filter to blocks neighboring the current block is satisfied, in response to determining that the condition is satisfied, applying the intra smoothing filter to the blocks neighboring the current block, and perform intra prediction based on the filtered blocks to obtain a characteristic value for the current block.

(10) The video decoder according to feature (9), in which the condition indicates that the intra smoothing filter is applied regardless of block size.

(11) The video decoder according to feature (9) or (10), in which the condition is satisfied in response to a determination that a block size of the non-square block is greater than or equal to a block size threshold.

(12) The video decoder according to feature (11), in which the block size is determined in accordance with a height, width, or an average of the height and width of the current block.

(13) The video decoder according to any one of features (9)-(12), in which the processing circuitry is further configured to: determine whether a coding tool that performs the intra prediction supports the wide angle mode, and in response to the determination that the coding tool does not support the wide angle mode, change the angular prediction mode from the wide angle mode to an intra prediction mode included in the range of directions that spans the bottom left diagonal direction and top right diagonal direction of the current block.

(14) The video decoder according to feature (13, in which the angular prediction mode is changed to an intra prediction mode in the range of directions having a direction that is opposite to a direction of the wide angle mode such that the changed intra prediction mode is 180 degrees from the wide angle mode.

(15) The video decoder according to feature (14), in which the angular prediction mode is changed to an intra prediction mode in the range of directions that is nearest to the wide angle mode.

(16) The video decoder according to feature (14), in which the coding tool is selected from a group of coding tools that includes Position Dependent Prediction Combination (PDPC), Adaptive Multiple Transform (AMT), Non-Separable Secondary Transform (NSST), and Prediction dependent transform.

(17) A non-transitory computer readable medium including instructions stored therein, which when executed by a processor in a video decoding apparatus, causes the processor to execute a method that includes determining, for a current block that is a non-square block, whether an angular intra prediction mode for the current block is a wide angle mode that is in a direction outside of a range of directions that spans a bottom left diagonal direction and top right diagonal direction of the current block; in response to determining that the angular intra prediction mode is the wide angle mode, determining whether a condition to apply an intra smoothing filter to blocks neighboring the current block is satisfied; in response to determining that the condition is satisfied, applying the intra smoothing filter to the blocks neighboring the current block; and performing intra prediction based on the filtered blocks to obtain a characteristic value for the current block.

What is claimed is:

1. A method for video encoding, comprising:
   determining, for a current block that is a non-square block, whether an angular intra prediction mode for the current block is a wide angle mode that is in a direction outside of a range of directions that spans a bottom left diagonal direction and a top right diagonal direction of the current block;
   in response to determining that the angular intra prediction mode is the wide angle mode and a block size of the current block is less than a block size threshold,
   enabling an intra smooth filter,
   applying the enabled intra smooth filter to blocks neighboring the current block to generate filtered blocks, and
   performing intra prediction based on the filtered blocks to encode the current block; and
   in response to determining that the angular intra prediction mode is the wide angle mode and the block size of the current block is greater than or equal to the block size threshold,
   disabling, prior to performing the intra prediction on the current block, the intra smooth filter such that the intra smooth filter is not applied to the blocks neighboring the current block, and
   performing the intra prediction based on the blocks neighboring the current block that are not filtered by the intra smooth filter to encode the current block.

2. The method according to claim 1, wherein the performing the intra prediction based on the filtered blocks further includes:
   determining whether a coding tool that utilizes the filtered blocks for performing the intra prediction supports the wide angle mode,
   in response to the determination that the coding tool does not support the wide angle mode, changing the angular intra prediction mode from the wide angle mode to an intra prediction mode included in the range of directions that spans the bottom left diagonal direction and top right diagonal direction of the current block, and
   in response to the determination that the coding tool does support the wide angle mode, encoding the current block in accordance with the wide angle mode.

3. The method according to claim 1, wherein the block size of the current block is determined in accordance with a height, width, or an arithmetic mean of the height and width of the current block.

4. The method of claim 2, wherein the angular intra prediction mode is changed to an intra prediction mode in the range of directions having a direction that is opposite to a direction of the wide angle mode such that the changed intra prediction mode is 180 degrees from the wide angle mode.

5. The method of claim 2, wherein the angular intra prediction mode is changed to an intra prediction mode in the range of directions that is nearest to the wide angle mode.

6. The method according to claim 2, wherein the coding tool is an intra prediction coding tool.

7. The method according to claim 6, wherein the intra prediction coding tool is Position Dependent Prediction Combination (PDPC).

8. A video encoder for video encoding, comprising:
   processing circuitry configured to:
   determine, for a current block that is a non-square block, whether an angular intra prediction mode for the current block is a wide angle mode that is in a direction outside of a range of directions that spans a bottom left diagonal direction and a top right diagonal direction of the current block,
   in response to a determination that the angular intra prediction mode is the wide angle mode and a block size of the current block is less than a block size threshold,
   enabling an intra smooth filter,
   applying the enabled intra smooth filter to blocks neighboring the current block to generate filtered blocks, and
   perform intra prediction based on the filtered blocks to encode the current block, and
   in response to a determination that the angular intra prediction mode is the wide angle mode and the block size of the current block is greater than or equal to the block size threshold,
   disable, prior to performance of the intra prediction on the current block, the intra smooth filter such that the intra smooth filter is not applied to the blocks neighboring the current block, and
   perform the intra prediction based on the blocks neighboring the current block that are not filtered by the intra smooth filter to encode the current block.

9. The video encoder according to claim 8, wherein the performance of the intra prediction based on the filtered blocks further includes the processing circuitry further configured to:
   determine whether a coding tool that utilizes the filtered blocks for performing the intra prediction supports the wide angle mode,
   in response to a determination that the coding tool does not support the wide angle mode, change the angular intra prediction mode from the wide angle mode to an intra prediction mode included in the range of directions that spans the bottom left diagonal direction and top right diagonal direction of the current block, and in response to the determination that the coding tool does support the wide angle mode, encode the current block in accordance with the wide angle mode.

10. The video encoder according to claim 8, wherein the block size of the current block is determined in accordance with a height, width, or an arithmetic mean of the height and width of the current block.

11. The video encoder of claim 9, wherein the angular intra prediction mode is changed to an intra prediction mode in the range of directions having a direction that is opposite to a direction of the wide angle mode such that the changed intra prediction mode is 180 degrees from the wide angle mode.

12. The video encoder of claim 9, wherein the angular intra prediction mode is changed to an intra prediction mode in the range of directions that is nearest to the wide angle mode.

13. The video encoder according to claim 9, wherein the coding tool is an intra prediction coding tool.

14. The video encoder according to claim 13, wherein the intra prediction coding tool is Position Dependent Prediction Combination (PDPC).

15. A non-transitory computer readable medium having instructions stored therein, which when executed by a processor in a video encoder causes the video encoder to execute a method comprising:

determining, for a current block that is a non-square block, whether an angular intra prediction mode for the current block is a wide angle mode that is in a direction outside of a range of directions that spans a bottom left diagonal direction and a top right diagonal direction of the current block;

in response to determining that the angular intra prediction mode is the wide angle mode and a block size of the current block is less than a block size threshold, enabling an intra smooth filter, applying the enabled intra smooth filter to blocks neighboring the current block to generate filtered blocks, and performing intra prediction based on the filtered blocks to encode the current block; and in response to determining that the angular intra prediction mode is the wide angle mode and the block size of the current block is greater than or equal to the block size threshold, disabling, prior to performing the intra prediction on the current block, the intra smooth filter such that the intra smooth filter is not applied to the blocks neighboring the current block, and performing intra prediction based on the blocks neighboring the current block that are not filtered by the intra smooth filter to encode the current block.

16. The non-transitory computer readable medium according to claim 15, wherein the performing the intra prediction based on the filtered blocks further includes:

determining whether a coding tool that utilizes the filtered blocks for performing the intra prediction supports the wide angle mode, in response to the determination that the coding tool does not support the wide angle mode, changing the angular intra prediction mode from the wide angle mode to an intra prediction mode included in the range of directions that spans the bottom left diagonal direction and top right diagonal direction of the current block, and in response to the determination that the coding tool does support the wide angle mode, encoding the current block in accordance with the wide angle mode.

17. The non-transitory computer readable medium according to claim 15, wherein the block size of the current block is determined in accordance with a height, width, or an arithmetic mean of the height and width of the current block.

18. The non-transitory computer readable medium according to claim 16, wherein the angular intra prediction mode is changed to an intra prediction mode in the range of directions having a direction that is opposite to a direction of the wide angle mode such that the changed intra prediction mode is 180 degrees from the wide angle mode.

19. The non-transitory computer readable medium according to claim 16, wherein the angular intra prediction mode is changed to an intra prediction mode in the range of directions that is nearest to the wide angle mode.

20. The non-transitory computer readable medium according to claim 16, wherein the coding tool is an intra prediction coding tool.

* * * * *